Dec. 12, 1961 C. F. ROUSE, JR., ET AL 3,012,697
VIBRATING APPLICATOR FOR PARTICLED MATERIAL
Filed Dec. 8, 1958
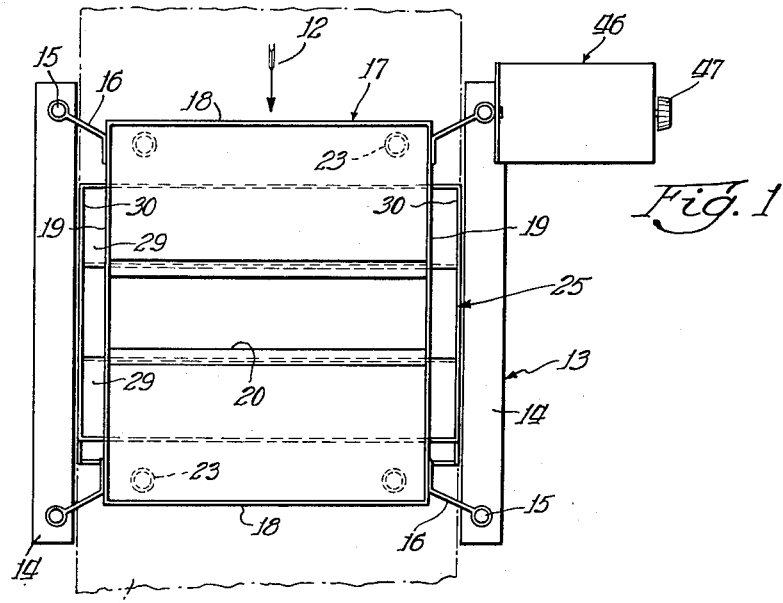
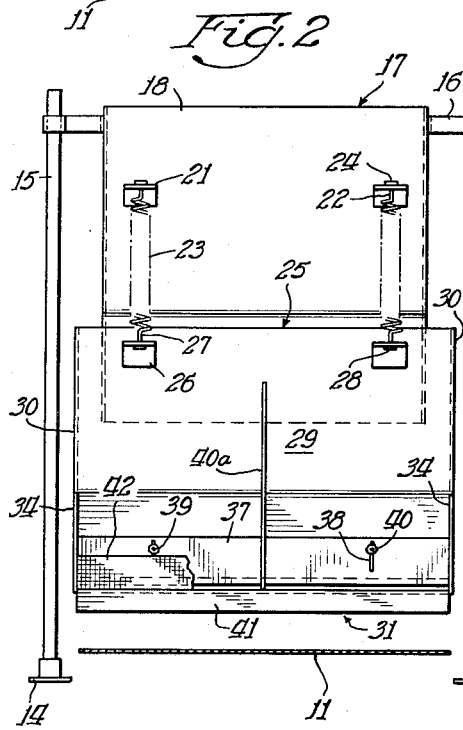
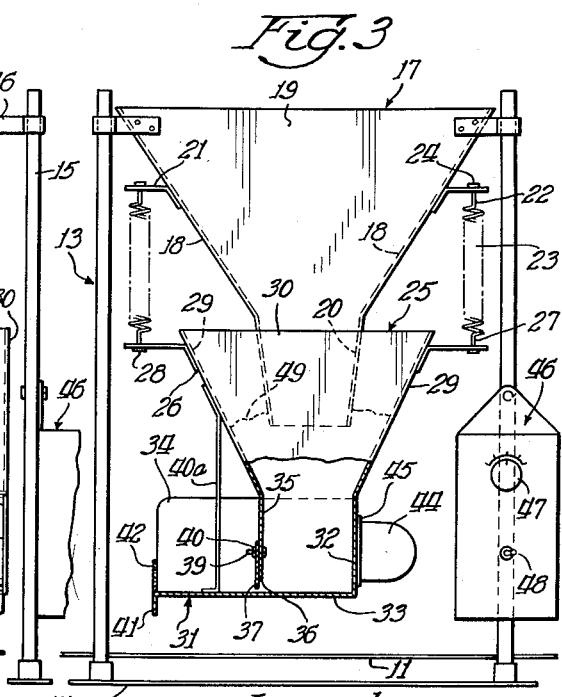
Inventors:
Charles F. Rouse, Jr.
Nicholas J. Powell and
James B. Hartman
By: Jones, Darbo & Robertson Attys.

3,012,697
VIBRATING APPLICATOR FOR PARTICLED MATERIAL
Charles F. Rouse, Jr., Mission, Kans., and Nicholas J. Powell and James B. Hartman, Kansas City, Mo., assignors to Interstate Bakeries Corporation, Kansas City, Mo., a corporation of Delaware
Filed Dec. 8, 1958, Ser. No. 778,915
5 Claims. (Cl. 222—181)

This invention relates to vibrating applicator for particled material and more particularly for material such as flour, sugar, cinnamon and the like as used and applied in wholesale bakeries.

One special application of the particled material such as flour is the dusting and spreading of a film or layer of flour on a belt that carries dough from one stage in its preparation to another to prevent the dough from sticking to the belt. Other similar uses are contemplated.

In general, the invention contemplates an applicator or spreader that is of simple construction and avoids conventional moving parts such as grates, bars or the like, that involve difficult cleaning problems as well as being apt to clog and get out of order.

An important object of the invention is the provision of an improved applicator of this class in which a material hopper is resiliently supported and carries rigidly connected thereto and otherwise unsupported an electric vibrator the force of vibration of which may be increased or decreased to control the rate of application of the flour to the belt.

These and other objects and advantages will be apparent from the following description, taken together with the accompanying drawing, showing an illustrative embodiment of the invention, in which drawing—

FIGURE 1 is a plan view of a device embodying the present invention, a section of the moving belt over which it is installed being shown schematically;

FIGURE 2 is a front elevational view of the device of FIG. 1 showing a cross-section of the belt; and FIGURE 3 is a side elevational view showing a longitudinal edge of the belt.

Referring in detail to the illustrative construction shown in the drawing, a dough-carrying conveyor belt 11 is shown that may be suitably trained in endless fashion upon rollers and other conveyor elements not necessary to be here described. The belt may be traveling for example, in the direction of the arrow 12, only the upper run of the belt being here indicated.

Erected over the belt run and to straddle the latter is a frame 13 that includes longitudinal plates 14 secured to any suitable base expedients along respective sides of the conveyor mechanism. Rising from the base plates 14 are corner posts 15 that at their tops carry inwardly directed brackets 16 to which are secured the receptacle 17. The latter is rectangular in plan, here having its longer dimension extending in the direction of the belt. The receptacle 17 has the downwardly inwardly tapered front and rear walls 18 closed by side walls 19 that are in parallel planes extending in the direction of the belt, the side walls being somewhat triangulated to conform to the taper of the front and rear walls 18. At its lower end the receptacle 17 terminates in a funnel-shape outlet 20 that is, however, of longer dimension crosswise of the belt than longitudinally.

In accordance with the present invention, on its front and rear tapered walls 18 the receptacle 17 has attached thereto, as by welding, ears 21 that are perforated to receive the upper ends 22 of expansion or extension coil springs 23. The spring ends 22 are shown secured to the ears 21 by retainers or elements 24 of any suitable character. In this instance there are four such ear and spring arrangements located respectively adjacent outer corners of the receptacle 17.

Further in accordance with the present invention, suspended on and by the coil springs 23 is a hopper 25 that carries brackets 26 to which the lower ends 27 of the springs 23 are suitably secured, as by retainer elements 28. Hopper 25, somewhat like receptacle 17, has tapering front and rear walls 29 and side walls 30 that are parallel to the side walls 19 of the receptacle. In this instance, the hopper 25 has its greater dimension extending crosswise of the belt and is here shown somewhat longer in this direction than the receptacle 17 so as to be approximately coextensive with the transverse dimension of the belt. As illustrated, funnel-shaped lower end 20 of the receptacle 17 enters well into the hopper 25 for a purpose presently pointed out. At its lower end, hopper 25 carries and is in communication with a discharge box 31. Discharge box 31 has a solid back wall 32, solid bottom wall 33, and solid side walls 34. As here shown, discharge box 31 may be constructed as a downward continuation of the hopper 25, and, in this case, the front wall 29 of the hopper is downwardly continued as at 35 parallel with the discharge box rear wall 32 but terminates short of the bottom wall 33 thereby leaving a restricted opening 36. Opening 36 desirably extends the entire distance crosswise of the hopper and discharge box.

For regulating the effective size of the restricted opening 36, the wall 35 carries an adjustment plate or gate 37 across and along the opening. Adjustment plate 37 is slotted as at 38 to receive stud screws 39 passing from the wall 35 into the slots by which the height of the plate 37 may be varied. A selected adjustment may be fixed by a clamping nut 40 on the screw 39. Brace 40a, connected at its upper end to hopper 25 and at its lower end to discharge box 31, assists in supporting the forward end of the discharge box, the latter being supported entirely by the hopper 29 which is in turn supported entirely by the receptacle 17.

At its forward edge the bottom wall 33 of the discharge box 31 is turned downward as at 41 to provide an apron coplanar vertically with a riddle or screen 42 secured along the forward edge of the lower wall 33 and upstanding therefrom, between the side walls 34, for a limited vertical distance.

Still further following the present invention, on its rear wall 32, in this instance, the discharge box 31 carries rigidly connected thereto an electric vibrator 44 rigidly secured to the wall 32 as at 45. Vibrator 44 is advantageously of a type that changes an alternating current of a given cycle frequency to pulsating waves with a time interval between each wave, which latter may be varied by suitable control means to increase or decrease the amplitude or power of the mechanical oscillations in the hopper 25 and its discharge box 31. Such a vibrator is available on the market sold by Syntron Company, Homer City, Pennsylvania, known as Syntron Pulsating Magnet Electric Vibrator V9, that includes a selenium rectifier for changing the alternating current into pulsating current. Variable electrical control for the vibrator 44 may be effected from a control box 46, conveniently supported on one of the posts 15, and including a rheostat control dial 47 for varying the power. An "on" and "off" switch 48 is also shown in the control box.

Operation of the applicator is as follows:

Flour, or other particled material desired to be spread, is poured into the receptacle 17 from which it falls by gravity into the hopper 25 and comes to rest initially on the bottom wall 33 of the discharge box 31. Preferably, sufficient of the material is deposited so that the hopper 25 is filled at least slightly above the lower end of the funnel 20 of the receptacle 17, somewhat as indicated at 49 (FIG. 3). Thereupon, the belt 11 having been put in motion, switch 48 is turned on and the dial 47 set for a desired electrical power. The vibrator 44 then goes into action and the vibrations thereof are transmitted to and throughout the hopper 25. This effect is facilitated by the spring suspension of the hopper 25, which is unsupported other than by the springs 23. The vibrator 44, also being rigidly connected to the discharge box 31 and through it to the hopper 25, is unsupported except by the same springs 23. Since the lower end of the funnel 20 is desirably embedded in the flour in the hopper 25, some vibration is transmitted to the flour in the receptacle 17 which assists the action of gravity in moving the material down through the receptacle into the hopper. Because of the weight of the flour above it and because of the vibration of the discharge box 31, the material moves forwardly on the lower wall or bottom 33 of the latter and toward the screen 42. Sufficiently comminuted particles pass through the screen and drop on to the belt 11 thereby suitably flouring or "dusting" the latter. This of course occurs throughout the transverse dimension of the belt as best seen in FIG. 2. Apron 41 assists in providing a uniform distribution of the flour onto the belt. By reason of the spring suspension for both the discharge box and the vibrator the vibrations are desirably somewhat localized.

One advantageous feature of the present device is that since the gate 37 is spaced rearwardly of the screen 42, and there is no obstruction above the screen, flour which does not pass through the screen 42 cannot clog or immobilize the applicator since it will merely pile up in back of the screen 42, the latter then acting principally as a baffle, and when sufficient flour has been accumulated, behind the screen, the flour will fall over the screen 42 and down onto the belt.

So constructed and arranged, the applicator has a minimum of moving parts and entire absence of sifter bars, overall screens or the like. It cannot become clogged or put out of order and is easily cleaned and renovated when necessary.

The ability of the operator to vary the rate of application of the flour enhances the versatility of the device for use with doughs of different character and with the speeds of movement of the conveyor belt.

It is to be understood that the invention is not limited to details of construction here shown for purposes of exemplification, and that such changes may be made as fall within the scope of the appended claims without departing from the invention.

What is here claimed is:

1. A vibrating applicator for particled material, comprising a frame, a receptacle rigidly mounted in the frame and having a funnel shape lower end, a hopper disposed below said lower end and having said lower end entered thereinto, coil springs suspended from said receptacle and solely supporting said hopper, whereby said hopper is solely and resiliently supported from said receptacle, a discharge box rigidly carried by the hopper at its lower end and in communication therewith, an electric vibrator rigidly carried by said discharge box, whereby said box and said vibrator are solely and rigidly supported by said hopper, a restricted distribution opening in the discharge box for exit of the particled material therefrom, a screen at the front of the distributor opening spaced forwardly thereof but extending upwardly for a limited distance whereby to provide a sifter for a normal amount of material but merely a baffle for an excess amount of material, and electric control means for varying the power of vibration to accelerate or decelerate the rate of application of the particled material.

2. The applicator of claim 1 wherein the springs are of the extension type and there is one at each of the four corners of the receptacle.

3. The applicator of claim 1 wherein the discharge box has an impervious lower wall over which the material may pass, and there is a vertically adjustable overhead gate in the discharge box at the forward end of said lower wall for providing said restricted opening.

4. A vibrating applicator for particled material, comprising, a receptacle having a funnel shape lower end, a hopper disposed below said lower end and receiving said lower end therein, four coil springs suspended from said receptacle and solely supporting said hopper, a discharge box rigidly and solely carried by the hopper at its lower end and in communication therewith, an electric vibrator rigidly and solely carried by said discharge box, and means for varying the power vibration to accelerate or decelerate the rate of application of the particled material.

5. In a vibrating particled material applicator, fixed structure including a main material receptacle having a funnel-shape lower end, a hopper disposed below said lower end and having said lower end entered thereinto, said hopper being smaller than said receptacle, a vibrator mounted upon and carried solely by said hopper to vibrate the same, resilient means solely supporting said hopper and vibrationally isolating the same from said fixed structure whereby vibration of said hopper is not transmitted to said fixed structure, a material discharge box having one end open and being rigidly carried by said hopper at its lower end and into which box said hopper opens, an adjustable gate providing an exit slot at the floor of said box throughout the width thereof, and a screen extending across the open end of said box, said screen being so limited in height that it provides a sifter for a normal amount of material but merely a baffle for an excess amount of material being discharged from said box in the operation of the applicator.

References Cited in the file of this patent

UNITED STATES PATENTS

| | | |
|---|---|---|
| 449,445 | Henry et al. | Mar. 31, 1891 |
| 1,783,423 | Harper | Dec. 2, 1930 |
| 2,311,373 | During | Feb. 16, 1943 |
| 2,323,864 | Weyandt | July 6, 1943 |
| 2,366,075 | Weyandt | Dec. 26, 1944 |